United States Patent [19]

Zeevi et al.

[11] Patent Number: 4,714,319

[45] Date of Patent: Dec. 22, 1987

[54] APPARATUS FOR RELIEF ILLUSION

[76] Inventors: Yehoshua Y. Zeevi, Department of Electrical Engineering, Technion Israel Inst. of Tech., Haifa, Israel; Antonio Medina, Filipinas 46, Madrid 3, Spain

[21] Appl. No.: 537,514

[22] Filed: Sep. 30, 1983

[51] Int. Cl.[4] ............................................. G02B 27/22
[52] U.S. Cl. .................................... 350/144; 350/132; 352/86; 358/89; 367/7
[58] Field of Search ............... 350/130, 132, 144, 131, 350/133, 139, 141, 143, 145, 146; 352/57, 60, 62, 86; 358/3, 88, 89, 92; 367/7

[56] References Cited

U.S. PATENT DOCUMENTS

| | | | |
|---|---|---|---|
| 1,481,006 | 11/1924 | Hammond | 350/130 |
| 1,533,437 | 4/1925 | Macy | 350/132 |
| 2,322,393 | 6/1943 | Richardson et al. | 350/132 |
| 4,172,632 | 10/1979 | Holmes | 350/132 |
| 4,214,257 | 6/1980 | Yamauchi | 358/3 |
| 4,305,095 | 12/1981 | Dallas | 358/3 X |

Primary Examiner—Jon W. Henry
Attorney, Agent, or Firm—Wolf, Greenfield & Sacks

[57] ABSTRACT

A means and method of generating disparate information for imparting depth perception to an image. An image is formed with a shadow from a plurality of energy sources. The energy sources each having a different locus. In one embodiment, using only two energy sources the image is detected by an image detector which permits the portion of the shadow formed by one energy source to be distinguished from the portion of the shadow formed by another source. In either a static-imaging system such as a still photograph or a dynamic system, such as television, means are provided for optically segregating the shadows viewed by each eye. In a monocular version of the dynamic imaging system, such as a motion picture film, a three-dimensional illusion is created by successively displaying images formed with different shadows.

13 Claims, 4 Drawing Figures

4,714,319

APPARATUS FOR RELIEF ILLUSION

BACKGROUND OF THE INVENTION

This invention relates to a means and method of imaging objects using a single-image detector and multiple energy sources to create disparate information to generate the appearance of a three-dimensional image. Three-dimensional imaging of both static and dynamic images have been known for many years. Early efforts at three-dimensional imaging involved the use of the stereoscope in which were viewed a pair of images or pictures of the same object, made with two cameras or a camera with a split or multiple lens and in which the lenses were spaced apart. In the systems using two cameras, the lenses were essentially at an interoccular distance. Thus, pairs of disparate images were formed and then viewed with a stereoscope in which each eye viewed the corresponding image. Subsequently, anaglyph stereoscopy was developed in which left and right images were chromatically coded by respected complementary color filters for viewing through corresponding glasses to separate the disparate images required for a three-dimensional effect. Variances of anaglyph stereoscopy were developed using a single-lens system such for example, as those described in Songer U.S. Pat. No. 4,312,199 and Beiser U.S. Pat. No. 4,290,675. The Songer patent exemplifies recent efforts to create a three-dimensional photographic system for both still and motion pictures which produces a compatible three-dimensional disparate information capable of being viewed, either with glasses for three-dimensional effect or viewed without glasses for a two-dimensional photographic effect. That system and others similar to it rely upon means for dividing the color spectrum into distinct images in the camera or image detector by a filter to simulate a multiple-lens system that required left and right eye resolution by appropriate filters or the like when the images are viewed. Such systems generally suffered from a variety of problems including for example, image distortion and blur, problems of image registry, viewer discomfort and fatigue resulting from foreground and background focusing problems, bulky attachments, costly components and other related difficulties.

A more recent effort to create a three-dimensional dynamic imaging system was partially described in a technology update appearing in *Popular Mechanics*, March 1983 entitled "3-D TV Is Here". In that article, there is an apparent description of a system for making three-dimensional television movies and slices which apparently require no special glasses, cameras, projectors or television sets. The system described generates a monocular depth effect by using conventional video equipment and an encoding device which produces a time-sequence display of images captured from two different points of view. In short, that system takes pictures of an object from two loci spaced apart at an interoccular distance and then displays these disparate image in time-sequence on a single image projector such as a television. This system, like the conventional three-dimensional imaging and anaglyph stereoscopic displays previously described has a number of limitations which have precluded its general acceptance for commercial and other purposes. These limitations include specifically, significant difficulties in decoupling depth information from image jitter and in providing a smooth motion picture or a picture which does not create viewer fatigue.

These and a wide range of other methods exemplified or referenced in U.S. Pat. Nos. 1,372,645; 1,595,295; 2,235,743; 2,360,322; 2,568,327; 2,751,826; 3,039,358; 3,731,606; 3,810,213; 3,990,087; 4,009,951; 4,189,210 have not resulted in a generally accepted process for creating a three-dimensional image which can be used for dynamic and static display in photography, television, video taping and other means of graphic representation of images.

OBJECTS AND SUMMARY OF INVENTION

The present invention provides an improved means and method of simulating three-dimensional still or moving binocular images. In particular, it is an object of the present invention to provide an improved means and method of simulating three-dimensional still photographs, motion pictures, video tapes, medical imagery such as X-rays, television images and other distance sensing devices such as those used in robotic and night vision displays.

A further object of the present invention is to provide an improved means and method of viewing a three-dimensional simulation of still photographs or other images in which the viewer may selectively view a three-dimensional simulation using a viewing device or a two-dimensional simulation without aid of the device and without any apparent distortion of the two-dimensional image.

A further object of the present invention is to provide an improved means and method of forming a two dimensional or three-dimensional simulation of an image in which conventional image detecting and recording means of conventional design may be used including conventional still cameras, motion picture cameras, X-ray cameras, video tape and television cameras and the like, and in which a simulation of a three-dimensional image is created by comparatively inexpensive auxiliary system that is simple to make and operate.

A further object of the present invention is to provide an improved means and method of simulating three-dimensional images which, in one embodiment, permits a dynamic three-dimensional-like image presentation without the need of a viewing device such as glasses and in which the three-dimensional-like image may be presented on conventional image display devices such as motion picture projectors, video tape projectors and television.

A still further object and advantage of the present invention is to provide an improved means and method of displaying dynamic or moving three-dimensional-like images in which the bulk of the images are not blurred, are fully chromatic, do not jump or hop and have a smooth and non-eye disturbing or tiring presentation to the viewer.

A still further object of the present invention is to provide an improved means and method of simulating three-dimensional imagery in which the viewer may selectively choose to view the object as a three-dimensional object when viewed through glasses or as a two-dimensional object without glasses, with the two- and three-dimensional images fully compatible with one another and displayable upon the same CRT or projector.

Another object of the present invention is to provide a means and method that will permit adaptation of existing equipment normally designed for two-dimensional photographic imagery such for example, as conventional 35 mm film to making of photographic images that may be viewed selectively as either two- or three-dimensional-like pictures.

Another object of the present invention is to provide an improved means and method of creating images for projection on television, video tapes and motion picture film in a manner which will allow the viewer to choose either two- or three-dimensional viewing without change or adaption of the normal television, video tape, motion picture or other viewing system in use.

Another object of this invention is to provide a means and method of sensing relative distance of an objects from robotic equipment which will permit selective manipulation depending upon relative distance of the objects by the robotic equipment. A still further objective of this invention is to provide a means and method of simulating depth generated image. Such means and method are of particular use and advantage in such diverse computer activated equipment as computer games and computer actuated flight simulators.

One further object of this invention is to provide an improved means and method of medical imaging and in particular, for means and method for three-dimensional viewing utilizing conventional fundus camera equipment in combination with a comparatively simple means and method of adapting such equipment. Such system contemplates an improved means and method of retinal examination.

Another use of the principles of the present invention relates to medical imaging at ultrasonic frequencies in which the principles of the present invention may be used for in creating depth perceptions for mamographics and the like.

In the present invention, depth perception is created by multiply projecting an image of an object using multiple energy sources to create a plurality of images having different shadows. This is achieved by utilizing a plurality of energy sources to successively or simultaneously illuminate the object and thereby define its images. A single detector records the images of the object so defined by the multiple energy sources. More specifically, a single energy detector such for example as a photographic or television camera detects and records successively, images of an object which are successively defined for such recording by multiple energy sources such for example as multiple light sources. Thus, for example, a camera is used to photograph an object with the object illuminated for successive frames from light sources at spaced apart locations. When that system is used to define a static image in a still photograph, multiple pictures of the image will have varying shadows encoding disparate information. If the photographs are viewed in a stereoscope, a three-dimensional image will result. A similar system may be designed in which a single photograph may be made utilizing multiple light sources of distinct characteristics including, for example, one light source with a red filter and second light source with a blue filter where the union the two filtered light sources spans the spectrum of white light. The resultant photograph will display to the unaided eye a single, well-defined, relatively sharp picture of the image with blurs confined to shadows. However, if the picture is viewed through glasses having one red and one blue lens, the image as viewed will have a three-dimensional appearance.

In a modification of the invention adapted specifically for use in a dynamic system, depth perception may be achieved without the use of glasses or other viewing aids. In such a system, an image detector such as a motion picture camera or television camera capable of taking successive frames of pictures in the conventional fashion is used. In this system, a plurality of spaced energy sources such as lights are synchronized with the camera so that successive frames of the exposed film are illuminated from these different light sources. The film when projected as a motion picture, video tape or television film will thus successively display frames illustrating the object which, in successive frames, has been illuminated from different and spaced light sources. When viewed, the image will have a three-dimensional or pseudo stereoptic effect which is not a true three-dimensional image, but is in substance, a dynamic shadowgram having an illusion of depth.

Thus, it is an object of the present invention to provide a method of creating a three-dimensional-like image of an object, consisting of directing onto an object radiant energy from a plurality of sources whereby a single detector such as a single lens camera that optically detects and records the image created by the radiant energy will record it with shadows of different characteristics, depending upon the specific energy source used for the particular image. Means are provided for segregating the portion of the shadow defined separately by the corresponding of the sources and for separately viewing one with each eye of the viewer, perceiving different ones of said images.

BRIEF DESCRIPTION OF THE DRAWINGS

The foregoing objects and advantages of the present invention will be more clearly understood when considered in conjunction with the accompanying drawings in which.

DETAILED DESCRIPTION OF THE INVENTION

Figure 1:
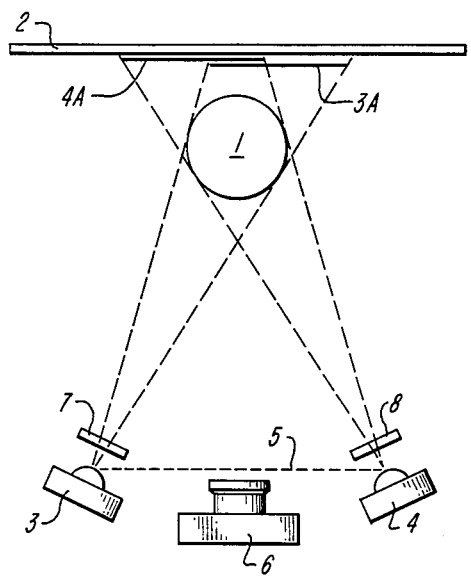
FIG. 1 illustrates the schematic embodiment of a preferred form of the invention.

The present invention is designed to creat a pseudo three-dimensional representation utilizing the shadows formed by energy sources impinging on the object from different angles to create plurality of images with disparate shadows. This system is useful in conventional single-lens three-dimensional photography, three-dimensional medical imagery such as funding camera and X-rays, three-dimensional television, motion picture video tape, ultrasound and the like and like dynamic representations, as well as distance sensing devices such robotics and night vision detectors as well as computer generated imagery for such purposes as computer games and flight simulators. The method and means of the present invention are best understood by reference to FIG. 1. In this arrangement, a three-dimensional-like image of the object 1 is formed. The object 1 is positioned in front of an energy reflective background 2. A plurality of energy sources 3 and 4 are spaced apart at a selected distance 5. An image detector or recorder 6 is suitably located in optical alignment with the object 1. The schematic illustration of FIG. 1 represents a variety of different systems. Thus, for example, FIG. 1 represents a means and method of making a three-dimensional still photographs. In this system, the background 2 must be of light reflective material such as a white screen on which a shadow may be formed. The energy sources 3 and 4 may be conventional light sources of the type normally used for still photography illumination. In such cases, the light sources 3 and 4 should be sufficient as to cast shadows with shadow 3A formed by light source 3 and 4A by light source 4. Since the resulting image or images must be viewed with one eye observing the image or portion of the image created by the light source 3 and the other viewing separately the image created by the light source 4, additional means are required for appropriate separation of these images when viewed.

Several methods may be used to segregate the images created by the different light sources. Thus, for example, if a stereoptic device is to be used, two photographs may be taken successively while the object 1 remains stationary. The first is taken with the light source 3 only, and the second is taken with light source 4 only. The resulting pair of disparate two dimensional images may then be viewed through a conventional stereoscope device to achive three-dimensional imagery.

The system illustrated in FIG. 1 may also be used to create a three-dimensional image utilizing different color filters such, for example, as a blue/green filter 7 and an orange/red filter 8. The resulting photograph taken with a camera 6 using light sources 3 and 4 and the respective filters 7 and 8, simultaneously, will create a single image with overlapping disparate shadows of different chromatic valves. When viewed through a conventional color-coded eyeglass system of the type frequently used to three-dimensional viewing, with one blue/green and the other red/orange lens, the resulting image will have a three-dimensional effect. Since the image is taken without movement of the camera 6, and since the three-dimensional effect is created by two light sources 3 and 4 with a single lens camera 6, the resulting photograph, when viewed without lenses, has an appearance quite close to a conventional two-dimensional picture with 3-D encoded information and the resultant image overlap and blur confined to the shadows, and thus may be viewed as such without the aid of glasses and without substantial fuzziness or distortion.

As illustrated in the embodiments of FIG. 1, depth information is essentially encoded in the shadow disparity which is generated by the multiple point sources of energy which, in photography, are light sources. It is apparent that the same system may be used for other than conventional visible light including, for example, infrared photography. The system may in substance also be used for medical imagery including fundus camera, ultrasound and in three-dimensional X-ray imagery. In the X-ray application, the image detector and recorder is of course an X-ray plate which would replace the background element 2 and also the camera 6.

When a system is used in which the images are recorded sequentially, it is important to achieve good stabilization of the detector. Thus, the detector 6 must be fixed in relation to the object 1 and background 2 during the fixing of the image. Such fixing is less important when two images separated into two spectral bands such, for example, by two-color filters, are recorded on the camera at the same time.

In the embodiment of FIG. 1, the spacing 5 between the two light sources 3 and 4 may vary in distance apart, thus enhancing of reducing disparity. Preferably the lights should be at a distance which is somewhat greater than the interoccular distance. However, too great a distance apart may distort the depth perception being generated. Placing the energy sources on the same side of the image detector 6 will minimize flicker and distortion.

The system generally described in respect to FIG. 1 can also be used for use in sensing relative distances of several objects from robotic equipment to permit the robotic equipment to selectively manipulate the objects depending upon their distances. Thus, for example, the system may be used to permit the selection by a robotic arm of the most remote of several objects. In such a system the several objects will cast shadows that differ from each other because of their relative distance from the light sources. These comparative distances may be sensed by the image detector 6, which may in this case be a television camera. The comparative size or quality of the shadows may then be measured and detected by a suitable comparator and the derived information used as an imput control to robotic equipment. Such system will provide more accurate determination of relative distance and thereby minimize likelihood of error in the use of systems not utilizing this depth perception means.

It is also contemplated that the same system be used for imparting depth perception in Medical imaging. Thus, for example, the system of FIG. 1 may be used for imparting depth perception to mamographs. In such a system the energy sources general energy is in the ultrasonic frequency range. The reflected energy is then used to create depth enhanced images in an image detector 6 suitable for such purposes.

Figure 2:
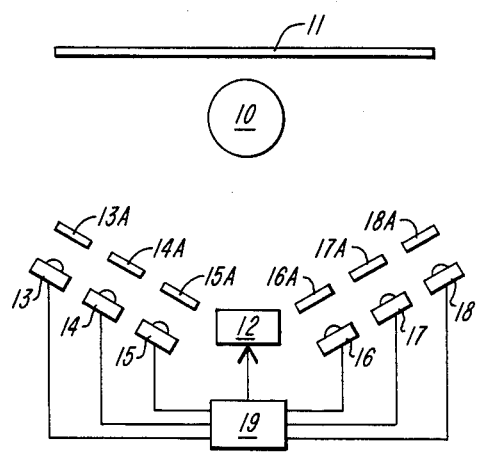
FIG. 2 illustrates schematically a modified form of the invention.

Depth perception for systems such as described in respect to FIG. 1 can be further enhanced by using more than two point sources of energy. This configuration is best illustrated in FIG. 2. In this arrangement, the object 10 is positioned before an energy reflective screen 11. The detector 12 is aligned with the object 10 and is suitably connected to a plurality of energy sources 13 to 18 through a suitable controller 19. The schematic illustration of FIG. 2 may be adapted for static imagery such as still photography or dynamic imagery such as motion pictures, television, video taping or the like. Thus, the image detector and recorder 12 may be a still camera, television camera, video camera or the like. In such cases, the energy sources 13 through 18 are light sources, and in such instances would be the visible spectrum. The light sources 13 through 18 are connected to an electronic time-controller 19. The electronic time-controller 19 is in turn connected electrically to the camera 12 by conventional means so that each time a photograph is taken by the camera 12 of the object 10, a successive light source 13 through 18 is triggered and the others are turned off. Thus, for example, in a motion picture film, six successive images of the object 10 will be taken utilizing successively light sources 13 through 18. While the embodiment of FIG. 2 specifically illustrates six light sources spaced uniformly apart and symetrical with respect to the camera 12, other variations of spacial-temporal combinations are possible. Additional light sources may be used to further enrich the depth information of the three-dimensional image. When this system is used with chromatically separated images, half of the light sources 13 through 18 will be filtered by filters of one color and the other half by filters of another color. These filters 13A through 18A may be divided into red/orange and blue/green and/or proportionally weighted filters with three of each appropriately selected. These images will present a conventional appearance when viewed without filtering glasses. However, when viewed with glasses having one lens red-/orange and the other blue/green, a three-dimensional effect is perceived, or sensed by a special purpose processing device.

The embodiment of FIG. 2 may also be used without the filters 13A through 18A to provide a three-dimensional monocular display. In this configuration, monocular depth information is created by sequential presentation of picture frames taken at the rate of several frames per second in which the successive frames are each made with successive light sources 13 through 18.

Since the image 10 is recorded by a single source 12, there is no apparent flicker or movement of the object 10, which would otherwise occur with use of a monocular lens system. Depth perception is generated by use of shadow and thus any undesired flicker or blur movement is confined to the shadow rather than image movement. This use of more than two light sources distributes the shadow information over a sequence of shorter distances, thus providing a smoother appearance to the depth perception.

Figure 3A:
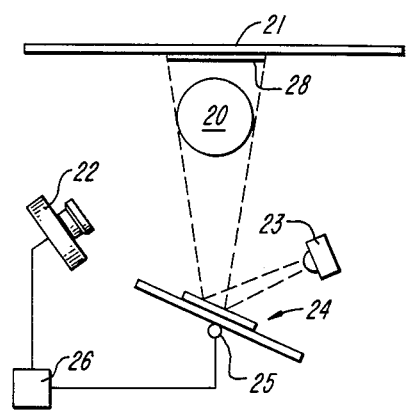
FIGS. 3A and 3B illustrate a specific embodiment of the invention in schematic form.
Figure 3B:
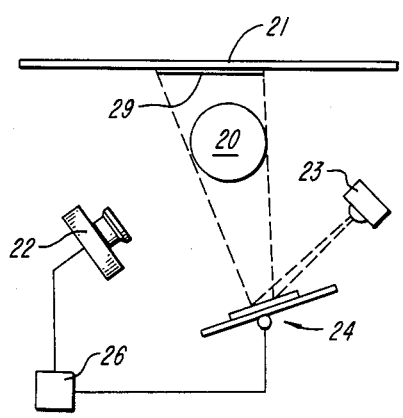

Referring now to FIGS. 3A and 3B, another system for creating a three-dimensional image is illustrated schematically utilizing a single energy source and a single image recorder. In this arrangement, the object 20 is positioned before a reflective background 21. A single image detector and recorder 22 such as a motion picture camera is aligned with the object 20. An energy source 23 such as a light beam is aligned with a mirror or energy reflecting device 24 suitably supported on a pivot 25 that is appropriately connected electrically by a controller 26 to the camera 22. The controller 26 is designed to move the mirror from the angle illustrated in FIG. 3A to the angle illustrated in FIG. 3B with each advancing of frame of the recording film in the camera 22. In operation, the mirror 24 moves from the position illustrated in FIG. 3A to the position illustrated in FIG. 3 and back again, etc. with each successive frame of picture taking. Thus, with each successive frame taken, the shadow cast by the light from the light source 23 will move on the background 21 between positions 28 and 29.

The configuration illustrated in FIGS. 3A and 3B work essentially on the same principle as that shown in FIG. 1. However, by using a single light source 23 and an oscillating mirror 24 rather than two light sources 3 and 4 as illustrated in FIG. 1, the problem of matching the luminance of different light sources is avoided. Thus, in the embodiment in FIG. 1, the use of separate light sources 3 and 4 requires careful matching of the lumens of these light sources to minimize flicker. A similar system as that illustrated in FIG. 1 may be used in which a common electric driver connected to the light sources 3 and 4 is provided with a feedback system having a light detector. Such a feedback system controls the power to the light sources 3 and 4 in order to assure uniform illumination from each of the light sources 3 and 4.

This invention also contemplates synthesizing images having a three dimensional appearance for use in such equipment as computer operated games and flight simulators. In such computer generated imagery an algorithm is developed to generate two images of a desired object with each image simulating the object as viewed from the same locus. However, the images are each synthesized as if illuminated with a light source eminating from different locations.

The images thus created each have shadows that are qualitatively different one from the other. These separate images may then be viewed as either static or dynamic images.

If viewed as static images, two may be stereoptically displayed in a conventional manner. If color is used an analytic system may be employed by creating the images with chromatically distinctive shadows in the manner described above, in which mutually distinctive color filters such as red and blue are used with the viewer observing the images simultaneously through one blue and one red lens.

When dynamically displayed, a monocular system may used. Here the images are successively displayed at least several per second to create an appearance of motion in a fashion similar to a motion picture television system. However, successive images with different simulated light sources are displayed.

We claim:
1. A system for forming a representation having three-dimensional characteristics of an object comprising,
   energy source means for directing energy onto said object from a plurality of points spaced apart from one another whereby said energy may be reflected and detected to form an image of said object having shadows formed by said energy eminating from said plurality of points,
   means for detecting said reflected energy in the form of said image, with the energy from different ones of said points defining separable shadows,
   and means for optically segregating for viewing separately by each of a viewer's eyes said separable shadows of said detected image.

2. A system as set forth in claim 1 wherein said energy source means comprises a plurality of light sources whereby said light sources are reflected to form a plurality of images having mutually distinctive shadows determined by the spacing apart of said energy sources.

3. A system as set forth in claim 2 wherein said light sources are at least in part in mutually exclusive frequencies of the visible light spectrum.

4. A system as set forth in claim 3 wherein said light sources include complementary color filters.

5. A system as set forth in claim 2 where said means for detecting images comprises a camera having a lens through which said reflected energy passes.

6. A system as set forth in claim 5 wherein said system includes means for recording said representations as images on film with images formed by the reflected energy from different sources recorded on different segments of said film.

7. A system as set forth in claim 6 wherein said camera is designed to record motion of said object and wherein perception of motion and depth is imparted to said object when viewed by displaying successively said segments of said recording means to a viewer whereby images formed in adjacent segments of said film so viewed are formed with shadows from different light sources.

8. A system as set forth in claim 7 wherein said camera is a motion picture camera.

9. A system as set forth in claim 7 wherein said camera is a television camera.

10. A system as set forth in claim 7 wherein said camera is a video tape camera.

11. A system as set forth in claim 6 wherein said camera is designed to record motion of said object and wherein perception of motion and depth is imparted to said object when viewed by recording simultaneously on the same segment of said film an image illuminated by a plurality of light sources spaced apart and each casting different shadows on said object, said light sources qualitatively differing from each other in a manner that is detected and recorded on said film and means when viewing said image for allowing each eye to see only selected ones of said qualitatively different shadows.

12. A system as set forth in claim 1 for use in sensing relative distances of a plurality of like objects that have been three-dimensionally represented comprising means for comparing the shadows formed by a plurality of said images and means for determining from said shadow comparison the relative distance of said objects.

13. A method of reresenting an object with enhanced depth perception comprising:

forming an image element of said object with said image element comprising an image of the object and shadow thereof formed by energy sources directed onto said object from different locations, said shadow having a first and second portions with said first portion of the shadow being formed from one direction, and said second portion of the shadow being formed from a second direction, said first and second portions being capable of being visually segregated from each other and thereafter viewing said image element while segregating in one eye of the viewer the portion of the shadow formed from one direction and in the other eye the portion of the shadow formed from the other direction.

* * * * *